United States Patent [19]

Sato et al.

[11] Patent Number: 4,924,243

[45] Date of Patent: May 8, 1990

[54] METHOD FOR MANUFACTURING LIQUID CRYSTAL DEVICE WITH SPACERS FORMED BY PRINTING

[75] Inventors: Masahiko Sato; Akira Mase, both of Atsugi; Hiroyuki Sakayori, Machida; Shunpei Yamazaki, Tokyo, all of Japan

[73] Assignee: Semiconductor Energy Laboratory Co., Ltd., Kanagawa, Japan

[21] Appl. No.: 197,434

[22] Filed: May 23, 1988

Related U.S. Application Data

[62] Division of Ser. No. 88,389, Aug. 24, 1987.

[30] Foreign Application Priority Data

Sep. 4, 1986 [JP] Japan .................................. 61-208617

[51] Int. Cl.⁵ ........................... G02F 1/13; B32B 31/00
[52] U.S. Cl. ................................ 350/320; 350/350 S; 156/277; 156/330; 428/1
[58] Field of Search ..................... 350/344, 350 S, 341, 350/339 R; 156/277, 330; 428/1

[56] References Cited

U.S. PATENT DOCUMENTS

| 3,684,614 | 8/1972 | Lemelson | 156/277 |
| 3,742,600 | 7/1973 | Lowell | 350/344 |
| 4,187,340 | 2/1980 | Oishi et al. | 428/1 |
| 4,224,093 | 9/1980 | Kohyama et al. | 350/344 |
| 4,367,924 | 1/1983 | Clark et al. | 350/344 |
| 4,613,395 | 9/1986 | Hasegawa | 156/277 |
| 4,643,532 | 2/1987 | Kleiman | 350/344 |
| 4,744,639 | 5/1988 | Tsuboyama | 350/344 |

FOREIGN PATENT DOCUMENTS

0173222  8/1986  Japan .................................. 350/344

Primary Examiner—Stanley D. Miller
Assistant Examiner—Trong Quang Phan
Attorney, Agent, or Firm—Sixbey, Friedman, Leedom & Ferguson

[57] ABSTRACT

An improved liquid crystal device and manufacturing method for same are described. In the device, a pair of substrates, between which a liquid crystal layer is disposed, is joined with pillars inbetween functioning as spacers which are provided of a resin by printing. With this structure, the spacers can be in surface contact with the inside surfaces of the substrates on which electrode arrangement and active devices are formed.

9 Claims, 4 Drawing Sheets

METHOD FOR MANUFACTURING LIQUID CRYSTAL DEVICE WITH SPACERS FORMED BY PRINTING

This is a divisional application of Ser. No. 088,389, filed Aug. 24, 1987.

BACKGROUND OF THE INVENTION

The present invention relates to a liquid crystal device and a method for manufacturing same.

A prior art photoelectric device with liquid crystal is illustrated in FIG. 1. The device, such as a liquid crystal display, comprises a pair of substrates 1 and 1' joined to each other with a suitable distance inbetween, a liquid crystal layer 5 disposed between the pair of substrates 1 and 1', opposed electrodes 2 and 2' formed on the opposed inside surfaces of the substrates 1 and 1' in the form of a matrix, and oriented coating 3 and 3' on the opposed insides contiguous to the liquid crystal layer 5. By virtue of application of a voltage to the electrodes 2 and 2', the optical characteristics of the liquid crystal 5 is changed under the electric field induced by the applied voltage. Namely, the device can be controlled by applying an voltage selectively to each pixel of the matrix to display an image or picture or storing information in terms of encoded signals.

The distance between the opposed substrates 1 and 1' is about 10 microns, while the device with the distance of 5 microns are now being developed. Although devices having twisted nematic liquid crystal can be constructed with the distances of this scale, the distance is demanded to be decreased to less than 3 microns, generally $2\pm0.5$ microns, when making use of a ferroelectric liquid crystal for the device in place of a nematic liquid crystal.

Conventionally, the distance has been kept by disposing spacers 7 and 4 between the pair of substrates 1 and 1'. In the figure, two kind of spacers are illustrated; one being mixed with a sealing member 6 and the other being disposed between the opposed electrodes 2 and 2'. For example, the spacers 4 are a plurality of spherical particles made of an organic resin such as Micro Pearl SP-210 having the average diameter of $10.0\pm0.5$ microns made of a bridged polymer of divinyl benzene. The spacers of Micro Pearl SP-210 are perfect spheres. The spacers 4 prevent the substrates 1 and 1' from contact due to unevenness of the substrates or due to external stress.

However, the spacers 4 and the electrodes 2 and 2' are in point contact so that the electrodes 2 and 2' are subjected to concentrated stress. In case where active devices are provided near the electrode 2 and 2', the concentrated stress may destroy the active devices or disconnect electrode curcuits, and therefore make the liquid device defective. Further, even with the spacers 7 and 4, it is very difficult to obtain a constant distance between the substrates because the spacers, when distributed between the substrates, tend to aggregate to local positions on the substrates and because the diameters of spacers are not constant. Even if uniform distribution of the spacers be obtained between the substrates, the distribution is disturbed during filling process of liquid crystal. Especially, when a ferroelectric liquid crystal is disposed between the substrates with 3 microns or less in distance, the liquid crystal is charged into the distance by virtue of capillary action from an opening provided on a portion of sealed-off perimeter of the substrates in the manner that the entrance is dipped in an amount of liquid crystal in a vacuum condition and then the pressure is increased so that the liquid crystal is caused to enter the device through the opening by the differential pressure. So, the stream of the liquid crystal tends to move the distributed spacers. Because of this unevenness of the distance, color shade appears on a display with a ferroelectric liquid crystal which utilizes birefringence. The defect can appear only due to external stress, such as push with a finger.

SUMMARY OF THE INVENTION

It is therefore an object of the present invention to provide a liquid crystal device with no color shade.

It is another object of the present invention to provide a method for manufacturing a liquid crystal device at high yield.

It is further object of the present invention to provide a liquid crystal device having resistance against external impact.

It is still further object of the present invention to provide a method for manufacturing a liquid crystal device at a low cost.

It is yet still further object of the present invention to provide a facilitated method for manufacturing a liquid crystal device.

DETAILED DESCRIPTION OF THE PREFERRED EMBODIMENTS

Figure 1:
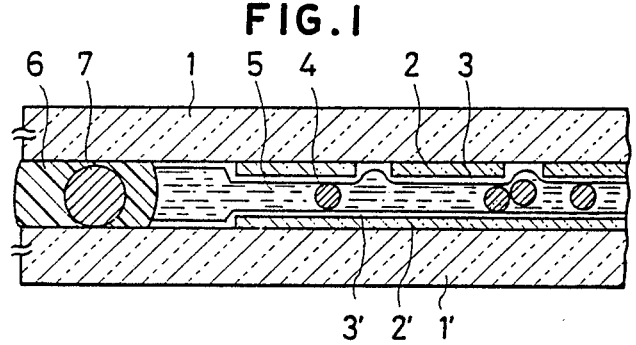
FIG. 1 is a cross section view showing a prior art liquid crystal device.
Figure 3:
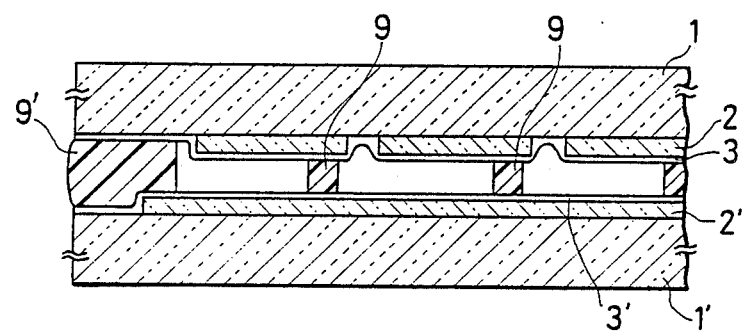
FIG. 3 is a cross section views showing a liquid crystal device in accordance with the present invention.

Referring now to FIG. 3, a liquid crystal device in accordance with the present invention is illustrated. In the figure the liquid crystal device comprises a pair of transparent substrates 1 and 1' which are mated with 3 microns, e.g., $2.2\pm0.5$ microns, in distance, a plurality of first electrode strips 2 and a plurality of second electrode strips 2' both made of conductive transparent oxide such as indium tin oxide, $SnO_2$ or the like and elongated in orthogonal directions to constitute a matrix, a plularity of pillars 9 as spacers and a sealing member 9', both being made of an adhesive, e.g. an epoxy resin such as "UV-307" distributed from Grace Japan Ltd., and a liquid crystal layer disposed between the substrates 1 and 1'. The inside surfaces of the substrates 1 and 1' are coated with 500 Å thick oriented thin films 3 made of a polyimide over the first and second electrode strips 2 and 2' respectively. The oriented films are given rubbing treatment.

Figure 2:
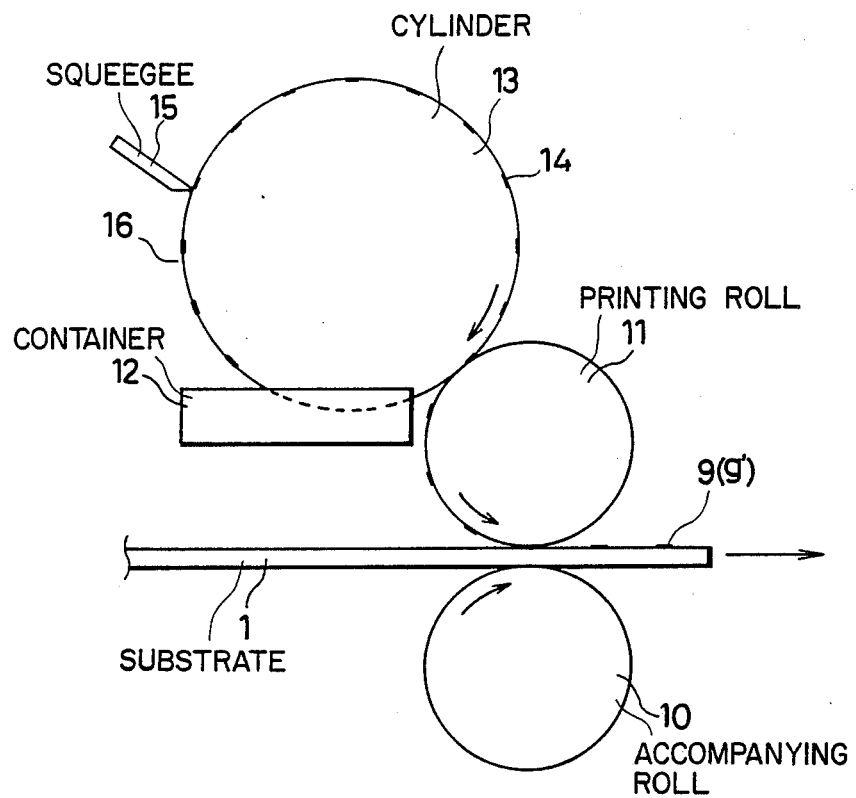
FIG. 2 is a side view showing a method for manufacturing a liquid crystal device in accordance with the invention.
Figure 4:
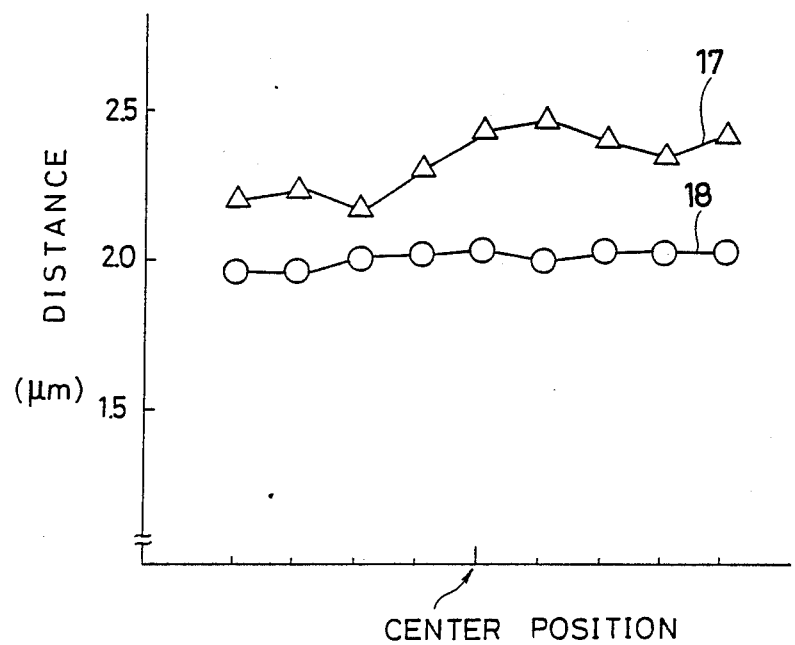
FIG. 4 is a graphical diagram showing, in relation to the position of the substrate, the distances between pairs of substrates of a liquid crystal device in accordance with the present invention and a prior art liquid crystal device.

Next, the process of a liquid crystal device by use of a screen printing machine in accordance with the present invention will be described. In FIG. 2, the printing press machine comprises a container 12 filled with an epoxy resin adhesive, a cylinder 13 whose surface is scratched in accordance with a prescribed pattern 14, a squeegee 15, a printing roll 11 engaged with the cylinder 13 and an accompanying roll 10 provided just below the printing roll 11 with a suitable interval therebetween. The adhesive in the container 12 is diluted with a thinner to 200 centipoises–100 poises. A substrate 1 having been provided with a first electrode strips and an oriented film is placed between the printing roll 10 and the accompanying roll 11 and caused to move to the right side as the two rolls are turning. Turning around its axis, the surface of the cylinder 13 passes through the adhesive in the container 12 and receive it thereon. The adhesive on the surface of the cylinder 13 is pushed off by the squeegee 15, remaining the portion in the scratched pattern 14. The printing roll 11 receives the adhesive in the pattern 14 as engaging with the cylinder 13. Eventually, the surface of the substrate 1 is printed with the adhesive in accordance with the pattern 14. The printed adhesive becomes the pillars 9 and the sealing member 9' shown in FIG. 2.

The height of the pillars 9 is about 20 microns, when printed on the substrate, which can be controlled depending on the diameter of pillar. The sealing member 9' is formed with an opening for charging a liquid crystal into the liquid crystal device therethrough. The pillars 9 on the electrode strip 2 have a cross section of 20 microns×20 microns respectively with intervals of 400 microns inbetween. The substrate provided with the sealing resin layer 9' and the pillars 9 is mated in a vacuum with an opposed substrate 1' which is provided with a plurality of second transparent electrode strips elengated in the direction perpendicular to the first electrode strips 2 on the substrate 1 as shown in FIG. 2. The mated substrates 1 and 1' are fixed by baking at 150° C. for an hour under a pressure applied from both external sides of the mated substrates. By this postbaking, the thickness is reduced to less than 3 microns, e.g., 2±0.5 microns, which is suitable for a ferroelectric liquid crystal device. In this connection, when at least one substrate has some flexibility, the distance between the substrates is kept constant even if the substrate is slightly warped because the pillars having a same height urge the substrates to compensate each other. Between the mated substrates, a ferroelectric liquid crystal is disposed by an existing method.

As experimental, the distance between substrates of 200 mm×300 mm joined in accordance with the present invention was measured. Nine measuring points were taken on the diagonal line of the substrates with an interval of 40 mm. 10 designates the results in FIG. 3. For reference, 11 designates the corresponding distances of a device produced by a prior art process with spacers made of almina having 2.0±0.3 microns in diameter which are distributed with methyl alcohol. As shown in FIG. 3, the distance in accordance with the invention is largely constant while the distance in accordance with the prior art is substantially scattered, and particularly is wide at the center position. In the case of the present invention, the distance is substantially not changed even when pushed with a finger. The fluctuation was only ±0.5 micron. When the invention is applied to a liquid crystal panel of 20 cm×30 cm formed with an active matrix structure having 400×1920 pixels, the distance between a pair of substrates was also kept constant.

Accordingly, finely finishing of the surface of a substrate can be dispensed with by means of provision of pillars as explained above. The cost of such finishing is higher than the price of a substrate for liquid crystal device, so that the price can be lowered by a factor of 2 to 5. Also in accordance with the invention, sealing process and spacer distributing process are implemented simultaneously. Further, spacers are prepared with an interval of 400 microns, corresponding to the interval between adjacent pixels, so that the device constracted with the spacers has resistance against external impact.

Figure 5A:
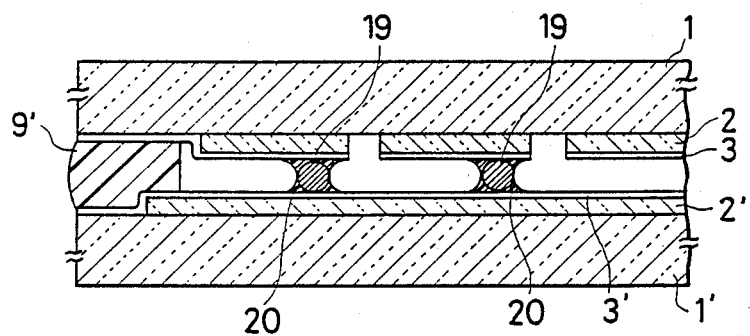
FIGS. 5(A) and 5(B) are cross section views showing modifications of devices according to the invention.
Figure 5B:
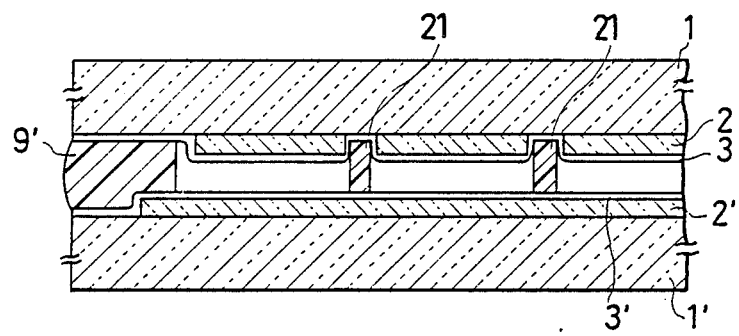

FIGS. 5(A) and 5(B) are cross sections showing second and third embodiments of the invention. In FIG. 5(A), pillars are formed with spheres 12 and adhesive 13 applied to the spheres for preventing the position of the spheres on the substrates 1 and 1'. FIG. 5(B) are prepared to show the pillars 14 can be provided between adjacent pillars.

While some embodiments are described supra, the present invention should not limited to these particular embodiments but only limited to the appended claims. Many modifications and variations may cause to those skilled in the art without departing the spirit of the invention. For example, the pillars 9 can be provided in the form of stripes or blocks. Also, instead of use of printing press machine, the pillars and the sealing members can be formed by screen printing.

What is claimed is:

1. A method of manufacturing a liquid crystal device comprising the steps of:
   forming an electrode arrangement on the inside surfaces of a pair of substrates;
   printing a prescribed pattern of pillars and a sealing member on the inside surface of one of said substrates;
   joining and uniting said pair of substrates; and
   disposing a liquid crystal material between said pair of substrates;
   wherein said printing step is implemented by a printing press including a container holding said material, a cylinder capable of rotating and receiving said material on a surface thereof which cylinder is formed with indentations corresponding to said patterns, a squeegee for pushing off said material other than that trapped in the pattern and a printing roll engaged with said cylinder which receives said material in the form of said prescirbed pattern;
   with said printing roll being adapted to engage said one substrate in order to transfer said pattern from said surface to a surface of the substrate such that the thickness of the pillars and the sealing members can be controlled in accordance with the depth of the indentations in the cylinder.

2. A method as in claim 1 where said liquid crystal material is ferroelectric.

3. A method of claim 1 wherein said printing press machine further comprising an accompanying roll which is located adjacent to said printing roll with a suitable interval and rotates with said printing roll so that a substrate can be transported therebetween.

4. A method of claim 1 wherein said material is a resin.

5. A method of claim 4 wherein said resin is an epoxy adhesive.

6. A method of claim 1 wherein the distance between said pair of substrates is less than 3 microns.

7. A method of claim 6 wherein said liquid crystal is a ferroelectric liquid crystal.

8. A method of claim 6 wherein said distance is 2.2±0.5 microns.

9. A method of claim 1 further comprising a step of prebaking said substrates which are united.

* * * * *